United States Patent [19]

Kacal et al.

[11] 4,266,566
[45] May 12, 1981

[54] SPRING ASSEMBLY FOR FLOATING SEAT RING

[75] Inventors: Gary W. Kacal, Rosenberg; Charles C. Partridge, Houston, both of Tex.

[73] Assignee: ACF Industries, Incorporated, New York, N.Y.

[21] Appl. No.: 60,951

[22] Filed: Jul. 26, 1979

Related U.S. Application Data

[63] Continuation-in-part of Ser. No. 960,499, Nov. 13, 1978.

[51] Int. Cl.³ ............................................. F16K 43/00
[52] U.S. Cl. .................................... 137/316; 251/174; 251/316
[58] Field of Search ................. 137/316; 251/174, 316; 267/165

[56] References Cited

U.S. PATENT DOCUMENTS

| 2,390,201 | 12/1945 | Bredenbeck | 251/174 |
| 2,480,529 | 8/1949 | Waag | 251/174 UX |
| 3,245,653 | 4/1966 | Lavigueur | 251/174 X |
| 4,151,855 | 5/1979 | Levin | 251/174 X |

Primary Examiner—Harold W. Weakley
Attorney, Agent, or Firm—Eugene N. Riddle

[57] ABSTRACT

A spring assembly (56) for a floating seat ring (40) to urge the seat ring into sealing engagement with the movable valve member. The seat ring is mounted in an enlarged bore portion at the valve chamber and has an annular rear face in opposed relation to a shoulder defined by the enlarged bore portion. The improved spring assembly is mounted in the spring pocket formed between the rear face and the shoulder and has a plurality of undulated annular wave springs (58, 60) about the seat ring. Each pair of contiguous wave springs is staggered so that the front nodes of one wave spring in each contiguous pair is in opposed contact relation to the rear nodes of the other wave spring of each contiguous pair. A flat portion (44A) on the outer circumference of the seat ring is in nested relation to a cooperating flat portion (64) on the inner circumference of the wave spring to maintain the wave spring in an oriented staggered relation.

6 Claims, 8 Drawing Figures

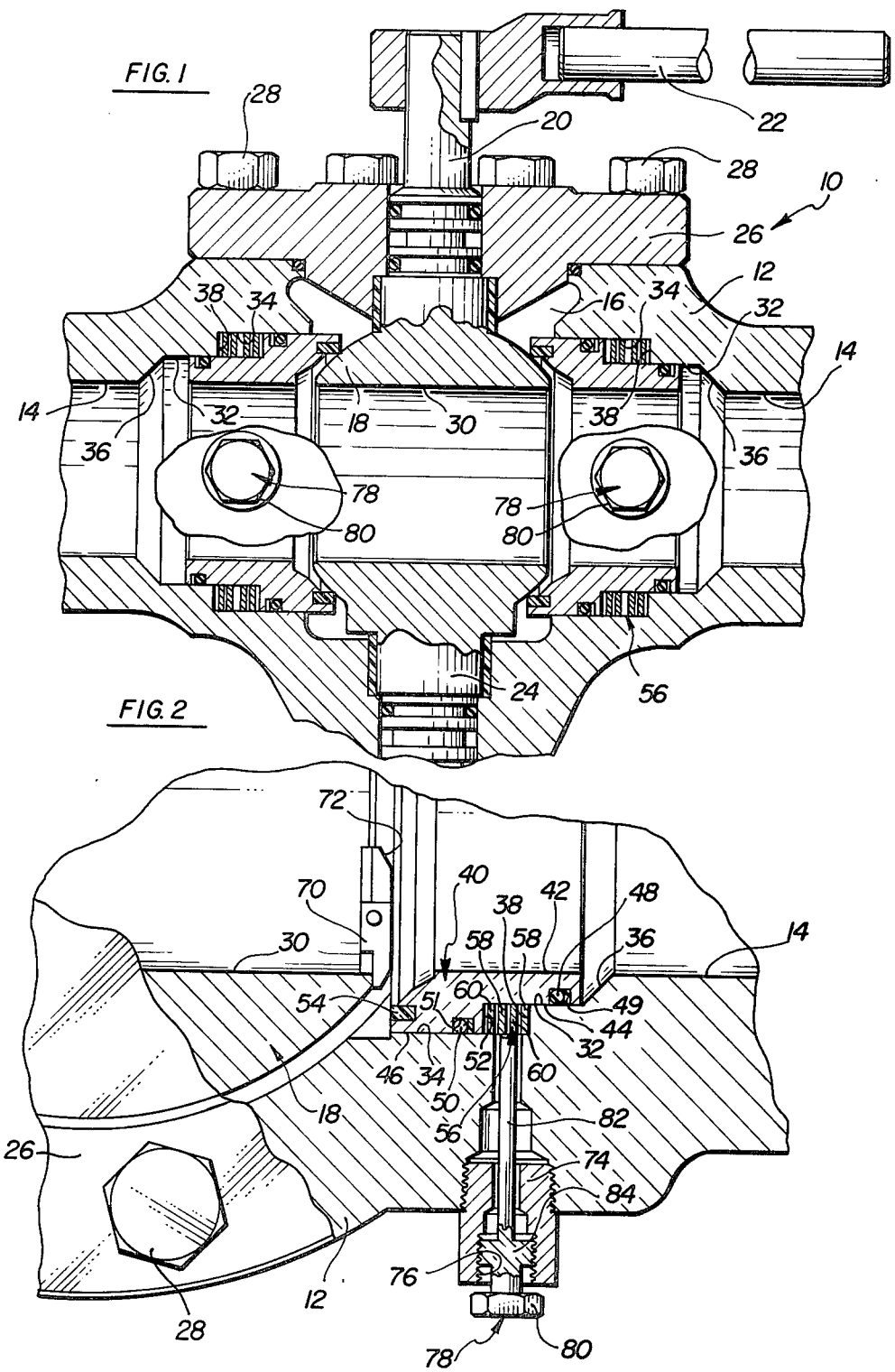

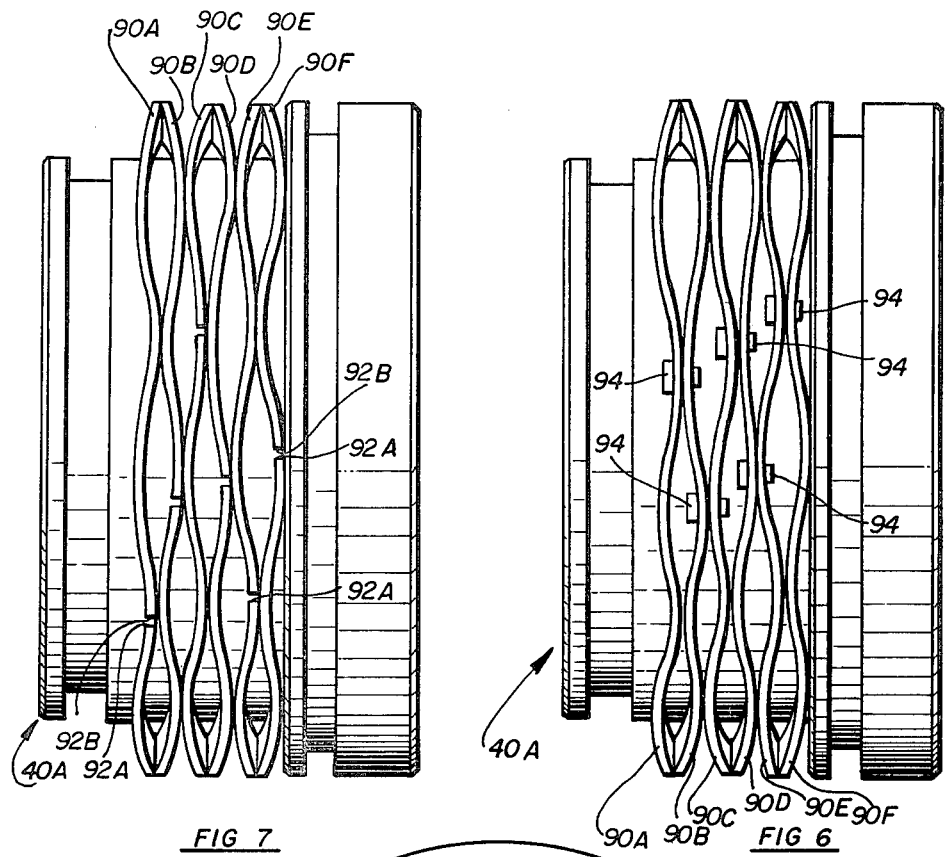
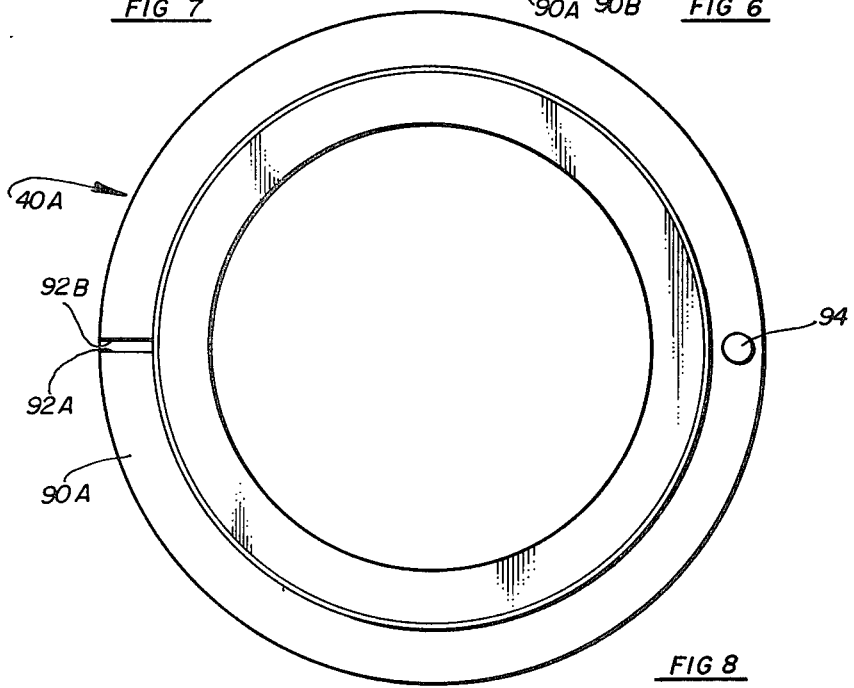

SPRING ASSEMBLY FOR FLOATING SEAT RING

REFERENCE TO RELATED APPLICATION

This is a continuation-in-part of application Ser. No. 960,499, filed Nov. 13, 1978.

BACKGROUND OF THE INVENTION

Heretofore, annular wave springs have been utilized to urge seat rings into sealing engagement with an associated valve member, such as a ball or a gate. As shown in U.S. Pat. No. 2,548,128 to J. R. Snyder dated Apr. 10, 1951, and U.S. Pat. No. 3,387,815 to C. G. F. Richards dated June 11, 1968, annular undulated wave springs are illustrated to urge a seat member into sealing engagement with an associated ball valve member. However, the prior art does not show the use of a plurality of annular undulated wave springs about a seat ring which are held in an oriented relation to each other so that contiguous wave springs are staggered with respect to the nodes of the springs.

DESCRIPTION OF THE PRESENT INVENTION

The present invention is directed to a spring assembly for a floating seat ring to urge the seat ring into sealing engagement with the adjacent valve member. It is particularly adapted to a ball valve seat ring in which the seat ring has a relatively large floating movement to permit the seat ring to be retracted to a position adequate to permit the removal of the ball valve member in a ball valve for replacement of the seat assembly or sealing element. The improved spring assembly is mounted in the spring pocket formed between the rear face of the seat ring and an opposed annular shoulder formed by a counterbore in the valve body at the valve chamber. The spring assembly comprises a plurality of undulated annular wave springs fitting about the seat ring, each pair of contiguous wave springs being staggered with respect to each other so that the front nodes of one wave spring in the contiguous pair is in opposed contact relation to the rear nodes in the other wave spring of the contiguous pair. A flat portion on the outer circumference of the seat ring is in nested relation to a cooperating flat portion on the inner circumference of the wave springs and maintain the wave springs in an oriented staggered relation thereby to prevent any relative circumferential movement of the wave springs with respect to each other.

As illustrated in copending application Ser. No. 902,324, filed May 3, 1978 and entitled "Means and Method for In-line Removal of Seat Rings in Ball Valves", a so-called top entry ball valve is shown in which the upper cover plate is first removed, and then the seat rings and ball are easily removed from the valve body while the valve is in place in a flowline. The rotative movement of the ball is utilized to cam the seat rings away from the ball to a fully retracted position where they are releasably retained while the ball is removed. Thus, a relatively large floating movement of the seat rings is desired and necessary in order to permit the removal of the ball. A camming tool is usually utilized with the ball to cam the seat rings away from the ball. The present invention is particularly adapted for use with the so-called top entry ball valve arrangement shown in application Ser. No. 902,324 but has utility with any floating seat arrangement where it is desired to urge continuously the seat ring into engagement with an adjacent valve member.

DESCRIPTION OF THE DRAWINGS

FIG. 1 is a longitudinal section of a ball valve of the top entry type having floating seat rings, with the spring assembly comprising the present invention urging the seat rings into engagement with the adjacent ball member;

FIG. 2 is an enlarged sectional view showing a seat ring cammed by the ball valve member into a retracted position and held in the retracted position by retaining means;

FIG. 6 is a side elevation view of another embodiment of the invention in which contiguous wave springs are secured to each other to maintain the wave springs in an oriented staggered relation;

FIG. 7 is a side elevation view similar to FIG. 6 but showing the wave springs at 180° to FIG. 6; and FIG. 8 is an end elevation of the seat ring and wave springs of the embodiment shown in FIGS. 6 and 7.

Figure 4:
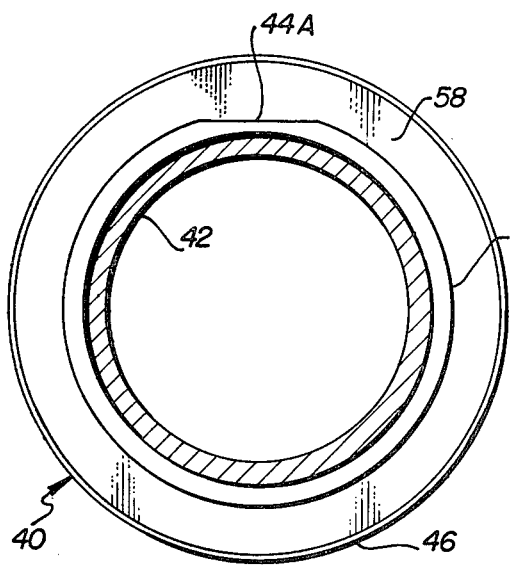
FIG. 4 is a section taken generally along the line of 4—4 of FIG. 3.

Referring now to the drawings, a ball valve structure is shown generally at 10 including a valve body 12 having flow passages 14. A valve chamber 16 between flow passages 14 has a ball valve member 18 mounted therein for movement between open and closed positions. A stem 20 secured to ball valve member 18 has a handle 22 which may be gripped for moving ball valve 18 between open and closed positions relative to flow passages 14. A lower trunnion 24 is mounted on the lower side of ball valve member 18. An upper cover plate 26 is removably connected to valve body 12 by suitable studs 28. Ball valve member 18 has a flow passage 30 therethrough which is adapted to be aligned with flow passages 14 when moved to an open position thereof as shown in FIG. 1.

Valve body 12 at the juncture of flow passages 14 with valve chamber 16 has a pair of enlarged bore portions or counterbores defined by intermediate diameter bore portion 32 and enlarged diameter bore portion 34. Intermediate diameter bore portion 32 defines a tapered shoulder or abutment 36 and enlarged diameter bore portion 34 defines a shoulder or abutment 38 which faces valve chamber 16. A seat ring generally indicated at 40 is mounted within counterbores 32 and 34 for floating longitudinal movement relative to ball valve member 18. Seat ring 40 has an inner circumferential or peripheral surface 42, a small diameter outer peripheral surface 44, and a large diameter outer peripheral surface 46. O-rings 48 and 50 are mounted in respective grooves 49, 51 in respective outer circumferential surfaces 44 and 46. O-rings 48 and 50 are adapted to block or restrict the flow of any lubricant inserted therebetween. Seat ring 40 has a rear face or shoulder defined at 52 extending between circumferential surfaces 44 and 46. A resilient sealing element 54 extends from the front face of seat ring 40 and is adapted to engage in sealing relation the adjacent sealing surface of ball valve member 18.

Mounted in the pocket formed between rear face 52 and the opposed valve body shoulder 38 is a spring assembly comprising the present invention and generally indicated by the numeral 56. Spring assembly 56 comprises a plurality of wave springs with alternate wave springs being indicated at 58 and intervening wave springs being indicated at 60. Each contiguous pair of wave springs 58, 60 is arranged in a staggered relation to each other. Each wave spring 58, 60 has four front nodes indicated at 58A and 60A respectively. The nodes are arranged at a 90° relation to each other about the circumference of the respective wave spring. Correspondingly, rear nodes 58B and 60B are provided about the circumference of respective wave springs 58, 60 between front nodes 58A and 60A. Front and rear nodes on a contiguous pair of wave springs are in opposed relation to each other. For example, rear nodes 58B on spring 58 are in opposed relation to front nodes 60A on the contiguous wave spring 60. Thus, rear nodes 60B on wave spring 60 are in contact relation with front nodes 58A on spring 58 of the contiguous pair. To hold the wave springs in oriented staggered relation and to prevent the wave springs from moving circumferentially about the circumferential surface 44 of seat ring 40, surface 44 has a flat portion 44A positioned thereon. The inner circumference 62 of each wave spring 58, 60 has an inner flat portion 64 which is arranged in nested relation to flat surface 44A on seat ring 40. In this relation, wave springs 58 and 60 are prevented from any rotation after being positioned on seat ring 40. Wave springs 58 and 60 are generally identical but upon initial positioning on seat ring 40, wave springs 60 are rotated around 45° with respect to wave springs 58. Also, flat portion 64 on wave springs 60 is positioned with respect to the nodes at a location staggered forty-five degrees (45°) circumferentially from flat portion 64 on wave springs 58 with respect to its nodes. By this arrangement, rear nodes 60B on wave springs 60 are in contact relation with the front nodes 58A on springs 58 thereby to provide a maximum expansion of wave springs 58 and 60 when arranged in a plurality of springs about a seat ring.

Referring to FIG. 2, seat ring 40 is shown as cammed rearwardly to its rearmost position with springs 58 and 60 in a generally flattened position thereof. A camming tool indicated generally at 70 and having a front cam face 72 is inserted in opening 30 of valve member 18 after cover plate 26 is removed and valve member 18 is rotated around forty-five degrees (45°) from its open position. When valve member 18 is rotated to fully open position surface 72 engages the front face of seat ring 40 to urge seat ring 40 to the rearmost position indicated in FIG. 2. While held in this position by cam tool 70 at the open position, a retainer is actuated to hold seat ring 40 in retracted position. The retainer comprises a housing 74 threaded within valve body 12 and having an internally threaded central bore 76. A threaded plunger indicated generally at 78 has an integral head 80 on its outer end and an elongated pin 82 on its inner end extending from body 84. Upon rotation of head 80 by a suitable wrench or the like, the inner end of pin 82 engages wave springs 58, 60 to compress springs 58, 60 against the adjacent circumferential surface 44 of seat ring 40 to hold seat ring 40 in a retracted position. Wave springs 58, 60 are made inoperable when engaged by pin 82 in a tight frictional relation. In this position, ball 18 may be removed. Then seal ring 40 may be released from retracted position by loosening plunger 78 and then removed from valve body 12. New or repaired seat rings 40 may be reinserted in valve body 12 and moved to a retracted position where they are held by the retainers to permit reinsertion of ball valve 18.

Figure 3:
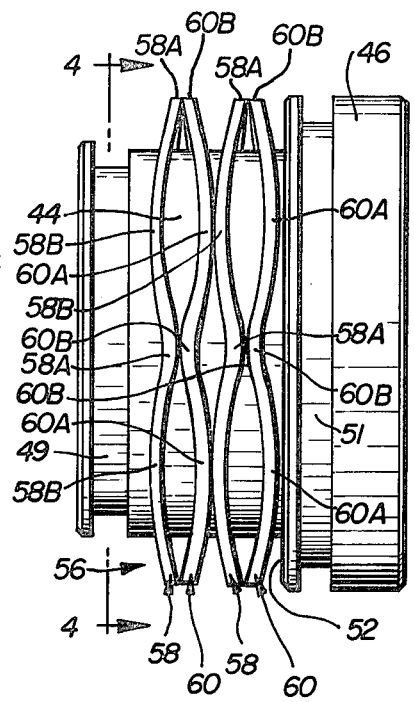
FIG. 3 is a side elevation view of the seat ring when removed from the valve assembly shown in FIG. 1 and showing the spring assembly mounted about the outer circumference of the seat ring.
Figure 5:
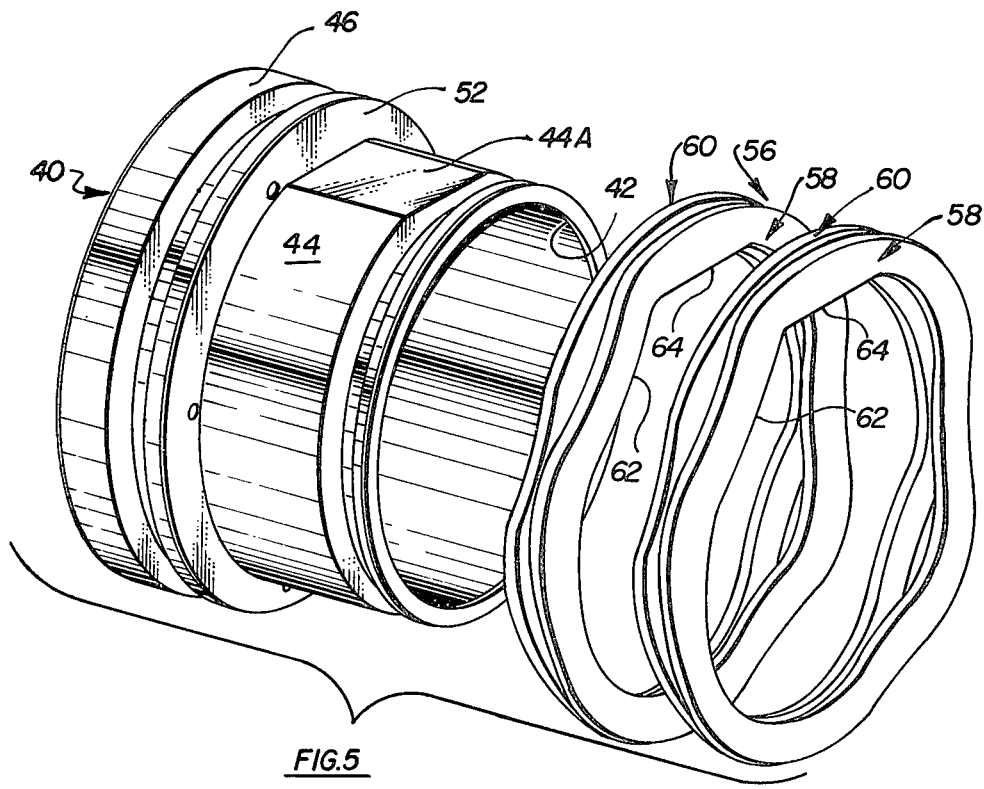
FIG. 5 is a perspective of the seat ring and spring assembly shown in FIGS. 3 and 4 with the wave springs of the spring assembly being removed from the seat ring.

Referring to FIGS. 6–8 in which a separate embodiment of the invention is illustrated, a plurality of separate split wave springs 90A, 90B, 90C, 90D, 90E, and 90F are shown each being formed from a metal strip. The ends 92A and 92B of each separate wave spring 90A, 90B, 90C, 90D, 90E, and 90F are closely spaced and staggered with respect to each other. Each wave spring is identically shaped but staggered with respect to the contiguous springs. To hold the springs in staggered relation to each other, each spring is riveted at 94 to the adjacent spring so that rear and front nodes on a contiguous pair of springs are held in an opposed relation to each other by rivets. Thus, it is not necessary to provide flats or other means to hold the springs in such staggered relation as in the embodiment shown in FIGS. 1–5. It is to be understood that other means for retaining the separate springs in such staggered relation may be provided, if desired, such as by spot welding, for example.

The arrangement of springs 90A, 90B, 90C, 90D, 90E and 90F permits a relatively long floating movement or travel of seat ring 40A and the length of travel may be adjusted by the total number of wave springs employed.

What is claimed is:

1. In a valve including a valve body having inlet and outlet flow passages communicating with a valve chamber, a valve member mounted in said valve chamber for movement between open and closed positions relative to the flow passages, an annular shoulder at the juncture of each flow passage with the valve chamber, and a seat ring mounted about each flow passage and having an annular rear face in opposed spaced relation to the associated shoulder to provide a spring pocket therebetween, the improvement comprising:

an annular spring assembly in the spring pocket between said rear face and said shoulder adapted to urge the seat ring toward the valve member, said spring assembly including at least a pair of contiguous undulated annular wave springs about the seat ring each wave spring having a plurality of rear and front nodes, the rear nodes on the rearmost wave spring being in contact with said shoulder and the front nodes on the foremost wave spring being in contact with said rear face, said pair of contiguous wave springs being staggered with the front nodes of one wave spring of said pair in opposed contact relation to the rear nodes of the other wave spring of said pair, and means to maintain each pair of wave springs in such staggered position.

2. In a valve as set forth in claim 1 wherein said means to maintain each pair of wave springs in staggered position comprises a flat portion about the outer circumference of the seat ring and a cooperating nesting flat portion about the inner circumference of the wave springs to hold the wave springs against rotative movement.

3. In a ball valve as set forth in claim 1 wherein each wave spring has a plurality of alternate front nodes and intervening rear nodes, the front nodes being spaced circumferentially of the wave spring about ninety (90) degrees with respect to each other.

4. A top entry ball valve including a valve body having inlet and outlet flow passages communicating with a valve chamber, a ball mounted in said valve chamber for rotation between open and closed positions relative to the flow passages, an upper cover plate removably secured to the valve body and permitting removal of the ball from the valve body when the cover plate is removed, an annular shoulder at the juncture of each flow passage with the valve chamber;

a seat ring mounted about each flow passage and having an annular rear face in opposed spaced relation to the associated shoulder to provide a spring pocket therebetween;

an annular spring assembly in the spring pocket between said rear face and said shoulder adapted to urge the seat ring toward the ball, said spring assembly including at least a pair of undulated annular wave springs about the seat ring each wave spring having a plurality of rear and front nodes, the rear nodes on the rearmost wave spring being in contact with said shoulder and the front nodes on the foremost wave spring being in contact with said rear face, said pair of contiguous wave springs being staggered with the front nodes of one wave spring of said pair in opposed contact relation to the rear nodes of the other wave spring of said pair, means to maintain each pair of wave springs in such staggered position, means to urge the seat ring to a retracted position in which the wave springs are compressed, and means to hold the seat ring in the retracted position.

5. A top entry ball valve as set forth in claim 4, wherein said means to hold the seat ring in retracted position comprises a plunger adapted to contact the outer circumference of the wave springs to urge the inner circumference of the wave springs into frictional engagement with the seat ring, said plunger being operated from a position outside the valve body.

6. A top entry ball valve as set forth in claim 4 wherein said means to maintain each pair of wave springs in staggered position comprises at least one rivet connecting said pair together.

\* \* \* \* \*